United States Patent
Lopez et al.

(10) Patent No.: US 9,140,815 B2
(45) Date of Patent: Sep. 22, 2015

(54) SIGNAL STACKING IN FIBER OPTIC DISTRIBUTED ACOUSTIC SENSING

(75) Inventors: Jorge Louis Lopez, Bellaire, TX (US); Johannes Hubertus Hyacinthus Maria Potters, Gouda (NL); Peter Berkeley Wills, Calgary (CA)

(73) Assignee: Shell Oil Company, Houston, TX (US)

( * ) Notice: Subject to any disclaimer, the term of this patent is extended or adjusted under 35 U.S.C. 154(b) by 398 days.

(21) Appl. No.: 13/805,679

(22) PCT Filed: Jun. 22, 2011

(86) PCT No.: PCT/US2011/041324
§ 371 (c)(1),
(2), (4) Date: Dec. 20, 2012

(87) PCT Pub. No.: WO2011/163286
PCT Pub. Date: Dec. 29, 2011

(65) Prior Publication Data
US 2013/0100768 A1     Apr. 25, 2013

Related U.S. Application Data

(60) Provisional application No. 61/358,672, filed on Jun. 25, 2010.

(51) Int. Cl.
*G01V 1/48* (2006.01)
*G01V 1/16* (2006.01)

(52) U.S. Cl.
CPC ... *G01V 1/48* (2013.01); *G01V 1/16* (2013.01)

(58) Field of Classification Search
CPC .................................. G01V 1/16; G01V 1/48
USPC .......... 367/25, 37; 73/152.16, 152.58; 702/14
See application file for complete search history.

(56) References Cited

U.S. PATENT DOCUMENTS

| 6,268,911 B1 | 7/2001 | Tubel et al. |
| 6,281,489 B1 | 8/2001 | Tubel et al. |

(Continued)

FOREIGN PATENT DOCUMENTS

| GB | 2364380 | 1/2002 |
| JP | 2001124529 | 5/2001 |

(Continued)

OTHER PUBLICATIONS

Ostrovskiy; "Seismic Signal Stacking in the Baltic Sea"; Physics of the Solid Earth,; vol. 31, No. 8; pp. 1-6; Mar. 1996; Retrieved from Internet on Oct. 11, 2011; http://eos.wdeb.ru/transl/izve/9508/pap07.ps.

*Primary Examiner* — Daniel L Murphy

(57) ABSTRACT

A method for obtaining information about a subsurface formation from acoustic signals that contain information about the subsurface formation, comprises a) transmitting an optical signal into a fiber optic cable (14) that includes a sensing apparatus (20) comprising a plurality of substantially parallel fiber lengths (24), b) collecting from the sensing apparatus a plurality of received optical signals, each received signal comprising a portion of the transmitted signal that has been reflected from a different segment of a cable length, wherein the different segments are each in different cable lengths and correspond to a single selected location along the sensing cable, and c) processing the collected signals so as to obtain information about an acoustic signal received at the different segments. The cable may be ribbon cable and the lateral distance between the different segments may be less than 10 meters.

9 Claims, 1 Drawing Sheet

(56) References Cited

U.S. PATENT DOCUMENTS

| | | |
|---|---|---|
| 6,588,266 B2 | 7/2003 | Tubel et al. |
| 6,644,402 B1 | 11/2003 | Sharma et al. |
| 6,787,758 B2 | 9/2004 | Tubel et al. |
| 7,040,390 B2 | 5/2006 | Tubel et al. |
| 7,201,221 B2 | 4/2007 | Tubel et al. |
| 7,284,903 B2 | 10/2007 | Hartog |
| 7,652,245 B2 | 1/2010 | Crickmore et al. ...... 250/227.12 |
| 7,668,411 B2 | 2/2010 | Davies et al. |
| 7,740,064 B2 | 6/2010 | McCoy et al. |
| 7,946,341 B2 | 5/2011 | Hartog et al. |
| 7,954,560 B2 | 6/2011 | Mathiszik et al. |
| 2002/0097636 A1 | 7/2002 | Vakoc |
| 2003/0043696 A1 | 3/2003 | Vakoc |
| 2003/0043697 A1 | 3/2003 | Vakoc |
| 2004/0043501 A1 | 3/2004 | Means et al. |
| 2004/0076222 A1 | 4/2004 | De Francesco et al. |
| 2005/0056632 A1 | 3/2005 | Lamb et al. ................... 219/390 |
| 2005/0060142 A1 | 3/2005 | Visser et al. |
| 2007/0038442 A1 | 2/2007 | Visser et al. |
| 2007/0110355 A1 | 5/2007 | Jaaskelainen et al. .......... 285/12 |
| 2007/0297807 A1 | 12/2007 | Chen et al. |
| 2008/0192735 A1 | 8/2008 | Huang .......................... 370/352 |
| 2008/0277568 A1 | 11/2008 | Crickmore et al. ...... 250/227.12 |
| 2009/0188665 A1 | 7/2009 | Tubel et al. |
| 2009/0240495 A1 | 9/2009 | Ramakrishnan et al. |
| 2009/0245026 A1 | 10/2009 | Bufi et al. |
| 2010/0013627 A1 | 1/2010 | Bufi et al. |
| 2010/0025048 A1 | 2/2010 | Franzen |
| 2010/0107754 A1 | 5/2010 | Hartog et al. |
| 2010/0207019 A1 | 8/2010 | Hartog et al. |
| 2010/0238763 A1* | 9/2010 | Gzara et al. ..................... 367/25 |
| 2010/0315630 A1 | 12/2010 | Ramos et al. |
| 2011/0044574 A1 | 2/2011 | Strong |
| 2011/0069302 A1 | 3/2011 | Hill et al. |
| 2011/0088462 A1 | 4/2011 | Samson et al. |
| 2011/0088910 A1 | 4/2011 | McCann et al. |
| 2011/0149688 A1 | 6/2011 | Hill et al. |
| 2011/0185815 A1 | 8/2011 | McCann |
| 2011/0216996 A1 | 9/2011 | Rogers |
| 2011/0280103 A1 | 11/2011 | Bostick |
| 2011/0292763 A1 | 12/2011 | Coates et al. |
| 2012/0017687 A1 | 1/2012 | Davis et al. |
| 2012/0018149 A1 | 1/2012 | Fidan et al. |
| 2012/0060615 A1 | 3/2012 | Farhadiroushan et al. |
| 2012/0067126 A1 | 3/2012 | Hartog et al. |
| 2012/0111560 A1 | 5/2012 | Hill et al. |
| 2012/0127459 A1 | 5/2012 | Handerek et al. |
| 2012/0179390 A1 | 7/2012 | Kimmiau et al. |
| 2012/0188533 A1 | 7/2012 | Crickmore et al. |
| 2012/0222487 A1 | 9/2012 | Hill et al. |
| 2012/0226452 A1 | 9/2012 | Hill et al. |
| 2012/0230628 A1 | 9/2012 | Hill et al. |
| 2012/0230629 A1 | 9/2012 | Hill et al. |
| 2012/0255362 A1 | 10/2012 | Den Boer et al. |
| 2013/0061688 A1 | 3/2013 | Hayward |
| 2013/0090867 A1 | 4/2013 | Strong |
| 2013/0211726 A1 | 8/2013 | Mestayer et al. |

FOREIGN PATENT DOCUMENTS

| | | |
|---|---|---|
| WO | 2009158630 | 12/2009 |
| WO | 2011067554 | 6/2011 |

\* cited by examiner

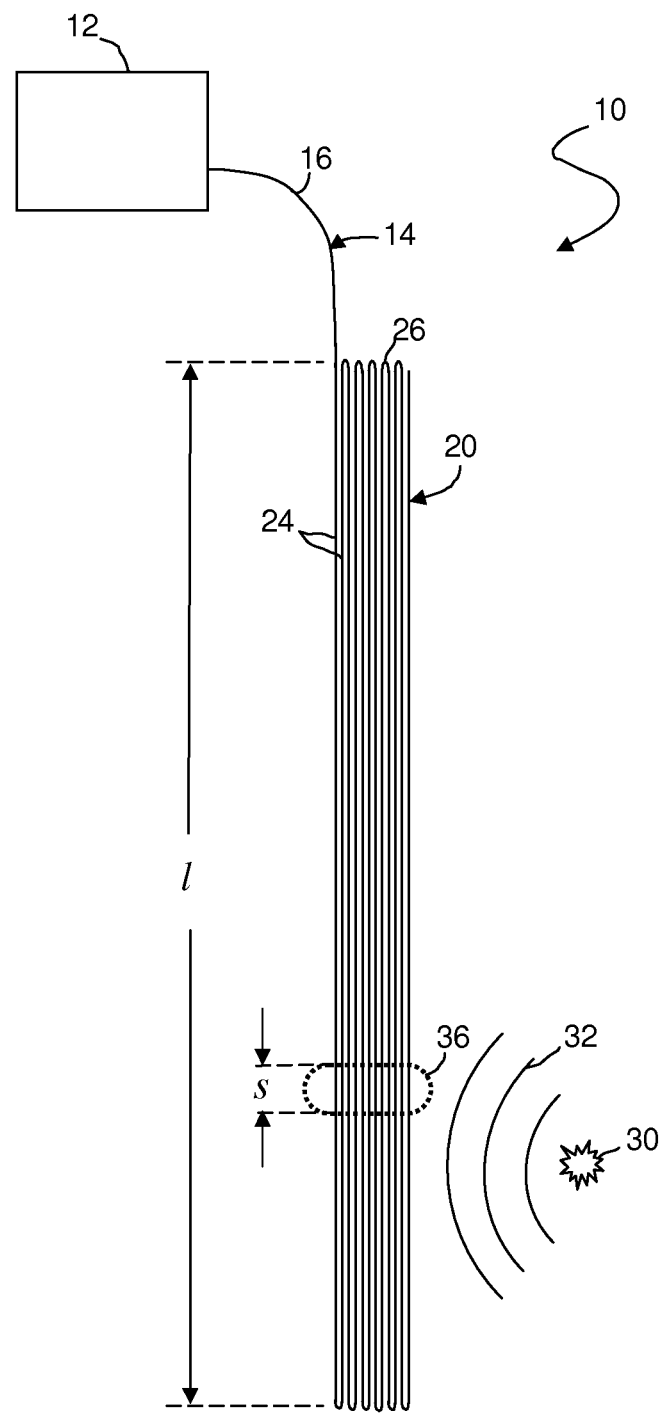

SIGNAL STACKING IN FIBER OPTIC DISTRIBUTED ACOUSTIC SENSING

RELATED CASES

The present application claims priority from PCT/US2011/041324, filed 22 Jun. 2011, which claims priority from U.S. provisional application 61/358,672, filed 25 Jun. 2010, which are both incorporated herein by reference.

FIELD OF THE INVENTION

The invention relates to a method of increasing the signal to noise ratio of an optical acoustic sensing system by sensing and stacking signals from a plurality of sections of optical fiber.

BACKGROUND OF THE INVENTION

Various attempts have been made to provide sensing capabilities in the context of petroleum exploration, production, and monitoring, with varying degrees of success.

Recently, these attempts have included the use of fiber optic cables to detect acoustic energy. Because the cables typically comprise optically conducting fiber containing a plurality of backscattering inhomogeneities along the length of the fiber, such systems allow the distributed measurement of axial strain along an optical fiber by measuring backscattered light from a laser pulse input into the fiber. Because they allow distributed sensing, such systems may be referred to as "distributed acoustic sensing" or "DAS" systems.

DAS systems operate using principles similar to Optical Time-Domain Reflectometry (OTDR). In OTDR, a fiber-optic cable is probed with a laser pulse from an interrogation unit. Defects in the glass backscatter the pulse (Rayleigh scattering) as it propagates along the fiber and the backscattered photons are received in a photodetector. The data is used to map the reflectivity of the fiber along its length. In DAS, external acoustic disturbances modulate the backscattered light from certain sections of the fiber. By recording these traces at high data rates (~5 kHz), DAS transforms the fiber into a large number of distributed microphones or sensors.

One use of DAS systems is in seismic applications, in which seismic sources at known locations transmit acoustic signals into the formation, and/or passive seismic sources emit acoustic energy. The signals are received at seismic sensors after passing through and/or reflecting through the formation. The received signals can be processed to give information about the formation through which they passed. This technology can be used to record a variety of seismic information.

While there exists a variety of commercially available DAS systems that have varying sensitivity, dynamic range, spatial resolution, linearity, etc., these systems tend to have an undesirably low ratio of signal to noise. This is due in part to the nature of back-scattering measurements, which rely on the presence of reflectors along the length of the fiber to provide the distributed sensing.

In addition, it has been discovered that distributed acoustic systems, particularly those that rely on Rayleigh backscattering are subject to significant noise and that the noise is random or statistical in nature. In instances where a high degree of precision is required, such as when a distributed acoustic system is used to monitor seismic signals, the signal to noise ratio is so small as to significantly reduce the value of the sensing system.

One way to increase the signal to noise ratio is to fire multiple light pulses at different frequencies and wavelengths into the fiber. This technique is disadvantageous, however, because it requires more complex data processing and optical components than a single-pulse system.

Thus, it is desirable to improve the signal to noise ratio of a DAS system while maintaining the relatively low cost and simplicity of DAS hardware.

SUMMARY OF THE INVENTION

The present invention improves the signal to noise ratio of a DAS system while maintaining the relatively low cost and simplicity of DAS hardware. In some embodiments, the present invention includes a method for obtaining information about a subsurface formation from acoustic signals that contain information about the subsurface formation by a) transmitting an optical signal into a fiber optic cable that includes a sensing apparatus comprising a plurality of substantially parallel fiber lengths; b) collecting from the sensing apparatus a plurality of received optical signals, each received signal comprising a portion of the transmitted signal that has been reflected from a segment of a different fiber length, wherein the different segments correspond to a single selected position along the sensing apparatus; and c) processing the collected signals so as to obtain information about an acoustic signal received at the different segments.

The plurality of substantially parallel fiber lengths may lie within 2 meters of each other.

The sensing apparatus may comprise a ribbon cable comprising a plurality of fibers and the plurality of fibers may be connected so as to form one long cable. Alternatively, the sensing apparatus comprises a single cable that is folded so as to form a plurality of substantially parallel cable lengths that lie within 2 meters of each other or the sensing apparatus may comprise a plurality of substantially parallel cable lengths that lie within 2 meters of each other and are connected so as to form one long cable. Step c) preferably includes processing the collected optical signals so as to generate seismic traces and stacking the seismic traces. Each fiber segment is preferably less than 10 m long.

BRIEF DESCRIPTION OF THE DRAWING

For a more detailed understanding of the invention, reference is made to the accompanying drawing, which is a schematic illustration of a cable configuration in accordance with a preferred embodiment of the invention.

As used herein, the term "surface" refers to the earth's surface and in marine applications to the seafloor. Items "at the surface" are acoustically coupled to the earth by direct or indirect physical contact with the surface, such as by being laid on the surface or by being placed in shallow trenches, as opposed to being placed beneath the surface, such as in a borehole.

As used herein the term "cable" refers generally to optical fiber, fiber optic cable, or any other device that is capable of transmitting optical signals, with or without coatings or other features.

DETAILED DESCRIPTION OF A PREFERRED EMBODIMENT

Referring to the FIGURE, a system 10 according to a preferred embodiment of the invention comprises a light box 12 and a fiber optic cable 14. Light box 12 comprises a light source and an optical receiver (not shown). Fiber optic cable 14 comprises an optional lead-in cable 16 and a sensing apparatus 20. If lead-in cable 16 is not present, sensing apparatus 20 may be connected directly to light box 12. Sensing apparatus 20 preferably comprises a plurality of n lengths of fiber 24, each length of fiber 24 having a length l, with adjacent pairs of fibers connected in series at fiber ends 26 so as to form an effective cable length L, where L=n×l.

One preferred embodiment of sensing apparatus 20 comprises one or more lengths of un-armored, dielectric-coated ribbon cable, such as SST-ribbon cable, such as is inexpensive and commercially available from Corning Cable Systems of Hickory, NC or from AFL Telecommunications of Duncan, S.C. Preferred ribbon cables contain 6-24 optical fibers and are jacketed or coated in one or more protective layers. In embodiments in which adjacent pairs of fibers in a length of ribbon cable are connected so as to form one long fiber, pairs of fiber lengths 24 are preferably formed using known techniques for joining pairs of fiber optic cable, such as splices (preferred) or connectors. If connectors are used, they may be selected from known connector types including but not limited to FC, SC, ST, LC, or MTRJ connectors.

While fiber lengths 24 are preferably provided in the form of a single ribbon cable comprising multiple fibers, other embodiments are envisioned in which two or more separate lengths of jacketed cable are provided. This may occur when the number of fibers available in a given ribbon cable is smaller than the number of lengths desired to make up sensing apparatus 20. In alternative embodiments, sensing apparatus 20 may be formed from a single length of fiber or cable having an overall length l that is folded into n segments, or may comprise a combination of folded cable and connected fibers. In some of these embodiments, it may still be preferred to connect pairs of fibers adjacent lengths of cable so as to form one long fiber having a desired overall length.

By way of example only, a sensing apparatus may be provided as an 800 ft length of ribbon cable containing 12-48 fibers. Adjacent fibers are connected together on-site to form a single continuous fiber having a length equal to the number of fibers×800. On one end, an optional lead-in fiber up to 2000 ft in length may connect the sensing cable to a light box.

Light source and receiver 12 is preferably a system for inputting a laser pulse into cable 14 and detecting backscattered light from one or more positions along the length of cable 14. Suitable light source and receiver components are available commercially from Qinetiq Limited of Great Britain and are described generally in U.S. Pat. No. 7,652,245.

Optional lead-in cable 16 is preferably any suitable fiber optic cable that is capable of transmitting the desired light signals from source 12 to sensing apparatus 20, such as SST-drop cable, such as is commercially available from Corning Cable Systems of Hickory, N.C.

Referring again to the drawing, when a cable 14 in accordance with the present invention is deployed near a source of noise 30 that transmits an acoustic signal 32, the arrival of signal 32 at cable 14 will cause a deformation of sensing apparatus 20. The deformation will temporarily alter the backscattering properties of the cable. Because at a given instant the deformation is localized within the fiber, the change in backscattering properties can be detected and location of the deformation can be determined using light signals transmitted and backscattered along the length of cable 14.

In particular, a fiber segment can be interrogated by identifying and collecting the portion of an optical signal that is backscattered from that segment. According to an embodiment of the invention, the interrogation is performed on several segments, each containing information about to the same location of interest along the length of sensing apparatus 20. A representative location of interest is illustrated by phantom enclosure at 36 and a representative set of segments is enclosed by phantom enclosure 36. Even though enclosure 36 illustrates the location of interest, it should be understood that the interrogated segments may not align exactly with the location of interest due to velocity uncertainty in the fiber or uncertainty in fiber geometry. Thus, the collected optical signals may be processed so as to effectively align the segments before further analysis of the data.

In the drawing, the selected segments each have length s. Segment length s is preferably less than 10 m, and more preferably less than 1 m.

The lateral distance, i.e. as measured normal to s, between interrogated fiber segments is preferably less than 10 meters, more preferably less than 1 m, more preferably less than 10 cm, and still more preferably less than 1 cm. Larger distances between individual cable lengths will result in a signal having a lower signal to noise ratio. For this reason, ribbon cable is a preferred embodiment of sensing apparatus 20.

The configuration of sensing apparatus 20 allows signal 32 to be detected practically simultaneously and at essentially a single location along the sensing apparatus by all of the fiber segments. Thus, the present invention allows multiple detections by several fiber segments of an acoustic disturbance at essentially a single location in the subsurface.

By gating the backscattered light received at light box 12, the portions of the optical signal attributed to each of the segments can be separated and analyzed. Using techniques that are known in the art, the resulting data can be processed on a processor so as to generate seismic traces. The traces can be stacked and the resulting stacked trace can be used to extract information about the direction and magnitude of the incoming acoustic signal(s).

Because it eliminates noise, the resulting stacked trace is expected to exhibit an improved signal to noise ratio over distributed acoustic systems that do not use stacking. We have discovered that distributed acoustic systems that rely on Rayleigh backscattering generate noise that is analogous to random noise in that it can be substantially eliminated through stacking techniques. By recognizing that noise in distributed acoustic systems tends to be statistical, the present invention provides the ability to analyze seismic data in a manner that results in a much higher signal to noise ratio.

The end of cable 14 that is not connected to light box 12 may be located proximal to the light box or remote from it. In either case, measurements can be based solely on backscattered light, if there is a light-receiving means only at the source end of the cable, or a light receiving means can be provided at the second end of the cable, so that the intensity of light at the second end of the fiber optic cable can also be measured.

In some embodiments, a one or more sensing cables may be deployed over the area to be monitored. In other embodiments, a cable can be deployed in a well. When deployed in a well, the cable can be lowered in a contained or un-contained mode, may be wrapped around a tubular in the well, or otherwise inserted so as to be acoustically coupled to the formation. The overall length of the cable can range from a few meters to several kilometers Similarly the operational length of the cable, i.e. the actual distance between the light source and the farthest portion of the cable, may range from a few meters to several kilometers.

In some embodiments, the sensing cable may be provided in conjunction with downhole equipment. By way of example only, fiber optic cable may be lowered into an existing well and be unrestrained in the wellbore, where it is typically surrounded by liquid. In other embodiments, the fiber optic cable can be clamped to various tools or to the inside or outside of casing or production or injection tubing at intervals, or affixed along its length by means of a suitable adhesive or the like. In still other embodiments, the fiber optic cable can be positioned on the outside of the casing so that it is acoustically coupled to the formation via the cement in the annulus.

In one embodiment of the invention, Fiber Bragg Gratings (FBGs) are included in portions of the fiber that are located near sections of the environment that are of particular interest.

Cable 14 can be used to sense acoustic signals (vibrations) from naturally occurring events, induced subsurface events, or active seismic sources at or beneath the surface. One example of a subsurface acoustic event is a fluid in-flow, where fluid from the formation, either gas or liquid, flows into the borehole. Depending on the well and location in the well, such in-flows may be desirable or undesirable. Regardless, a system that can detect and locate such in-flows would be advantageous. Another type of subsurface acoustic event that can be detected using the present system and method is fracturing of the formation. In addition, data collected from the present system can be processed to simulate data from "virtual sources," as is known in the art, or the system can be used to produce signals recorded at virtual receivers.

The present DAS system may be disposed in conventional 2D or 3D recording geometries, such as on or near the surface for surface seismic acquisition, near the seabed for ocean bottom marine acquisition, and in the water for marine acquisition. In some environments, it may be sufficient to lay the optical cable on the earth's surface, while in other environments it may be preferable to bury the cable in a shallow trench in order to enhance its acoustic coupling to the earth. The adaptable sensor network may also be installed in vertical, deviated, or horizontal boreholes for downhole seismic acquisition. These boreholes may be dedicated observation wells or production-related wells. Installation of the network is envisioned to be on a permanent basis, to maximize coupling to the formation and to reduce data acquisition costs.

The present system can record acoustic signals generated by seismic energy sources on the surface, in the water, or in boreholes, or can be passive in nature (e.g. microseismic detection). The monitoring systems that would result from such combination of sources and sensor networks includes all known geometries, such as 2D or 3D surface seismic, 2D or 3D ocean bottom or marine seismic, 2D or 3D VSP seismic, cross-well seismic, microseismic monitoring in boreholes or at surface from hydraulic fracturing or EOR processes, etc. Likewise, the present system can be used to monitor all propagation modes, including reflection and refraction (shear and compressional) waves, surface waves, Love waves and other guided modes. When the fiber optic cables are deployed downhole in horizontal wells, such configurations enable the use of virtual source seismic techniques, which are useful for reservoir monitoring under complex overburden.

In other embodiments, a system such as that described in U.S. Application No. 2008277568 can be used. That system uses pulsed pairs of light signals that have different frequencies and are separated in time. If used, such a system allows processing of the signal to be carried out more easily and with a greater signal-to noise ratio than is the case if radiation of a single frequency backscattered from different positions along the length of optical fiber is used to generate a signal at a photodetector by interferometery.

While the present invention has been described in terms of the preferred embodiments, it will be understood that various modifications thereto can be made without departing from the scope of the invention, as set out in the claims that follow. By way of example only, one of skill in the art will recognize that the number and configuration of cables and sensors, the sampling rate and frequencies of light used, and the nature of the cable, coupling devices, light sources and photodetectors can all be modified.

What is claimed is:

1. A method for obtaining information about a subsurface formation from acoustic signals that contain information about the subsurface formation, comprising:
   a) providing a plurality of received optical signals resulting from the transmission of an optical signal into a fiber optic cable that includes a sensing apparatus comprising a plurality of substantially parallel fiber lengths whereby each received optical signal comprises a portion of the optical signal that has been backscattered from a segment of a different fiber length;
   b) processing the received optical signals from the segments of the different fiber lengths so as to effectively align the segments with one location of interest along the sensing apparatus before proceeding to step c), wherein the different segments together correspond to a single selected location along the sensing apparatus; and
   c) on a processor, processing the received optical signals so as to obtain information about an acoustic signal received at the different segments there by obtaining practically simultaneous multiple detections by the different segments of the acoustic signals at the single selected location along the sensing apparatus.

2. The method according to claim 1 wherein the sensing apparatus comprises a ribbon cable comprising a plurality of fibers.

3. The method according to claim 2 wherein the plurality of substantially parallel fibers are connected in series so as to form one long fiber.

4. The method according to claim 1 wherein the lateral distance between the different segments is less than 10 meters.

5. The method according to claim 1 wherein the sensing apparatus comprises a single cable that is folded so as to form a plurality of substantially parallel cable lengths, wherein the lateral distance between interrogated fiber segments is less than 10 cm.

6. The method according to claim 1 wherein the sensing apparatus comprises a plurality of substantially parallel cable lengths wherein at least one fiber in each of said cable lengths is connected to a fiber an adjacent cable lengths so as to form one long fiber.

7. The method according to claim 1 wherein step c) includes processing the collected optical signals so as to generate seismic traces comprising one seismic trace for each of the different segments at the single selected location along the sensing apparatus, and stacking the seismic traces.

8. The method according to claim 1 wherein each segment is less than 10 m long.

9. The method according to claim 1, wherein the substantially parallel fiber lengths lie within 2 meters of each other.

* * * * *